United States Patent
Laakkonen et al.

(10) Patent No.: US 9,580,246 B2
(45) Date of Patent: Feb. 28, 2017

(54) METHOD AND A SYSTEM FOR PROCESSING MATERIAL THAT CONTAINS BIOMASS

(75) Inventors: Perttu Laakkonen, Parola (FI); Juha Palokangas, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 1106 days.

(21) Appl. No.: 13/638,784

(22) PCT Filed: Apr. 1, 2011

(86) PCT No.: PCT/FI2011/050284
§ 371 (c)(1),
(2), (4) Date: Dec. 7, 2012

(87) PCT Pub. No.: WO2011/121187
PCT Pub. Date: Oct. 6, 2011

(65) Prior Publication Data
US 2013/0079922 A1 Mar. 28, 2013

(30) Foreign Application Priority Data
Apr. 1, 2010 (FI) .................................. 20105342

(51) Int. Cl.
*B07C 5/04* (2006.01)
*B65G 1/137* (2006.01)
(Continued)

(52) U.S. Cl.
CPC ............... *B65G 1/137* (2013.01); *F23G 5/02* (2013.01); *F23G 5/50* (2013.01); *F23G 7/10* (2013.01);
(Continued)

(58) Field of Classification Search
CPC .... B07C 5/04; B07C 5/14; B07C 5/34; B07C 2501/0054; F23G 7/10; F23G 7/105;
(Continued)

(56) References Cited

U.S. PATENT DOCUMENTS 5,720,165 A 2/1998 Rizzie et al.
6,182,584 B1 2/2001 Gaudio
(Continued)

FOREIGN PATENT DOCUMENTS

CN 101555429 A 10/2009
EP 1746145 A2 1/2007
(Continued)

OTHER PUBLICATIONS

English Translation of EP 1746145 A2; Friedrich Franz; Pub. Jan. 24, 2007.*
(Continued)

*Primary Examiner* — Joseph C Rodriguez
(74) *Attorney, Agent, or Firm* — Cantor Colburn LLP (57) ABSTRACT

A method for processing material that contains biomass. The material is led onto a conveyor. The conveyor conveys the material to an apparatus for mechanical processing and/or to a further processing plant. The moisture content is measured and/or the size of pieces of non-combustible material and/or the content of non-combustible material in the material flow is measured in connection with the conveyor. Based on at least one of the measurements, material is conveyed to the material to be conveyed for further processing and/or to the apparatus for mechanical processing, or to at least one material to be conveyed elsewhere than to the further processing plant or the apparatus for mechanical processing. Also a system for processing material that contains biomass.

22 Claims, 1 Drawing Sheet

(51) Int. Cl.
  *F23G 5/02* (2006.01)
  *F23G 5/50* (2006.01)
  *F23G 7/10* (2006.01)
  *B07C 5/14* (2006.01)

(52) U.S. Cl.
  CPC  *B07C 5/04* (2013.01); *B07C 5/14* (2013.01); *F23G 2201/601* (2013.01); *F23G 2201/602* (2013.01); *F23G 2207/20* (2013.01); *F23G 2900/50214* (2013.01); *F23G 2900/55006* (2013.01); *F23G 2900/55007* (2013.01); *F23G 2900/55011* (2013.01); *F23N 2021/10* (2013.01)

(58) Field of Classification Search
  CPC ......... F23G 2201/601; F23G 2201/602; F23G 2900/50214; F23G 2900/55007; F23G 2900/55011; B65G 1/137
  See application file for complete search history.

(56) References Cited

U.S. PATENT DOCUMENTS

| | | | | |
|---|---|---|---|---|
| 8,051,986 B2* | 11/2011 | Lees | ........................ | B07B 4/02 |
| | | | | 209/138 |
| 9,162,231 B2* | 10/2015 | Bai | ........................... | C10L 5/06 |
| 9,217,188 B2* | 12/2015 | Bohlig | ................... | B29B 17/02 |
| 2003/0041984 A1* | 3/2003 | Jussila | ..................... | D21D 5/02 |
| | | | | 162/28 |
| 2005/0276451 A1 | 12/2005 | Hunking et al. | | |
| 2009/0039184 A1 | 2/2009 | Vanderpool | | |
| 2010/0017020 A1 | 1/2010 | Hubbard-Nelson et al. | | |
| 2010/0319595 A1* | 12/2010 | Sweeten | ................... | C10L 5/42 |
| | | | | 110/342 |
| 2013/0304546 A1* | 11/2013 | Carlin | ................... | G06Q 10/04 |
| | | | | 705/7.38 |
| 2014/0134599 A1* | 5/2014 | Macharia | ............... | C12M 21/12 |
| | | | | 435/3 |
| 2014/0290540 A1* | 10/2014 | Hall | ......................... | C10L 5/48 |
| | | | | 110/232 |
| 2015/0014230 A1* | 1/2015 | Kanagawa | ............. | C02F 11/12 |
| | | | | 210/143 |
| 2016/0169581 A1* | 6/2016 | Kotyk | ..................... | F26B 1/005 |
| | | | | 44/590 |

FOREIGN PATENT DOCUMENTS

| | | |
|---|---|---|
| FI | 111097 B | 5/2003 |
| JP | 08309227 A | 11/1996 |
| WO | WO-03/040635 A1 | 5/2003 |
| WO | WO-2007/000607 A1 | 1/2007 |
| WO | WO-2008/079319 A2 | 7/2008 |

OTHER PUBLICATIONS

Sjaak Van Loo, Jaap Koppejan; "The Handbook of Biomass Combustion & C0-firing"; Dec. 31, 2008; pp. 56-61, sentence 59-sentence 60.
Eija Alakangas and Carmilla Wiik; Kaytöstä poistetun puun luokittelu ja hyvien käytäntöjen kuvaus; pp. 1-84; Sep. 1, 2008.
Selvitysmie Pentti Hakkila; Selvitys energiapuun mittauksen järjestämisestä ja kehittämisestä; pp. 1-32, retrieved Dec. 17, 2010.
Finnish Office Action W/ Translation—December 23, 2010—issued in counterpart application FI 20105392.
PCT/ISA210—International Search Report issued in PCT/FI2011/050284—Jun. 19, 2012.
PCT/ISA/237—Written Opinion of the International Searching Authority issued in PCT/FI2011/050284—Jun. 19, 2012.
Finnish Patent Office Action W/ Translation—Jun. 7, 2012—Issued in Counterpart Application No. FI 20115656.
Pentti Hakkila; Puuenergian Teknologiaohjelma 1999-2003; May 2004; pp. 1-136.
The Handbook of Biomass Combustion and Co-firing; Biomass Fuel Supply and Pre-treatment; Dec. 31, 2008, pp. 59-61.

* cited by examiner

METHOD AND A SYSTEM FOR PROCESSING MATERIAL THAT CONTAINS BIOMASS

CROSS-REFERENCE TO RELATED APPLICATIONS

This application claims priority under 35 U.S.C. §119 to Finnish patent application 20105342 filed 1 Apr. 2010 is the national phase under 35 U.S.C. §371 of PCT/FI2011/050284 filed 1 Apr. 2011.

FIELD OF THE INVENTION

The invention relates to a method and a system for processing material that contains biomass.

BACKGROUND OF THE INVENTION

The use of biomass in various further processing plants, for example in the production of biofuel or as fuel for a boiler, is an increasing trend. For example peat or other biomass that is relatively easy to process has been typically used in further processing plants. For collecting wood material that might otherwise be decomposed in forests, such as stumps and logging residues, for utilization, a favourable material for further processing is also so-called fuel wood, which has turned out to be more difficult to use than the materials used before.

A delivery of stumps and other fuel wood also often contains material that is problematic for the processing of the material, such as rocks of various sizes, sand and clay, which may cause various problems in the further processing plants. The rocks, sand, clay, and other similar non-combustible material may be conveyed as loose material with the stumps and other combustible fuel wood, and furthermore, for example rocks may also be found partly or totally inside a stump. Said problematic materials also directly impair the production capacity; being non-combustible materials, they reduce the combustion capacity, for example, in boilers.

In the prior art, fuel wood has been primarily used as fuel for a boiler in such a way that the fuel wood has been supplied to be burnt in the boiler. However, a typical further processing plant is quite poorly resistant to relatively large rocks. For example in boilers, particularly detrimental problems are typically caused by non-combustible material clogging the grate or corresponding structures and the ash removal devices. In prior art, attempts have been made to avoid these problems by crushing the fuel wood and the large rocks conveyed with it before the further processing plant. Even in this way, the effect of the non-combustible material, such as rocks, clay or sand, on the production capacity cannot be reduced to a sufficient extent. Furthermore, large rocks may break said crusher or increase the need for its maintenance.

Yet another problem in the utilization of biomass as a source of energy for the further processing plant lies in the fact that the dry matter content of the biomass supplied to the further processing plant may, at times, be so low that the utilization of said biofuel is no longer economically viable. For example, the use of particularly moist fuel wood as the fuel is not economically viable in general, particularly in boilers.

At the moment, there is no proper quality control system for the supply of biomass that contains fuel wood, to encourage the suppliers of biomass to supply material of highest possible quality for further processing. Instead, the present system, in which the price paid for biomass is typically directly proportional to the total weight of a load, does not take into account the fact that the load of biomass also contains particularly heavy non-combustible or otherwise unsuitable material, such as wet wood material or rocks.

For performing quality control in a laboratory, a small sample is often analyzed, which should represent a load delivered to be processed or crushed. However, such an analysis rarely depicts the quality of the load in reality, among other things because it is not possible in practice to take a representative sample of a load that contains, for example, large stumps and stump parts, to depict the quality of the whole load. Furthermore, analysing such a sample normally takes at least a day and requires separate work. For these reasons, the level of quality control according to the prior art typically remains relatively poor.

In practice, the method according to the prior art may lead to a situation in which the further utilization of biomass, particularly fuel wood, for example as fuel for boilers or in the preparation of biofuel, is not necessarily cost-effective or even economically viable.

Thus, a need exists in industry for a solution to the above-mentioned problem in such a way that the quality of supplied biomass could be controlled more efficiently than in the prior art.

BRIEF SUMMARY OF THE INVENTION

It is an aim of the present invention to solve the above-mentioned problem in such a way that the control of the quality of biomass could be performed more efficiently than at present. It is an aim of an advantageous embodiment of the invention to solve the problem in such a way that on the basis of the quality of supplied biomass, feedback on the quality could be given to the supplier of the biomass. According to an advantageous embodiment of the invention, on the basis of the control of the quality of the biomass, the price for the biomass could be defined for each load in such a way that the price for biomass of good quality would be determined higher than the price for biomass of poor quality.

The method according to the invention for processing material that contains biomass. The system according to the invention for processing material that contains biomass.

In the presented approach, the quality of supplied biomass can be controlled more efficiently than in the prior art. The feedback obtained on the quality can also be used to give a more accurate estimate on the fee to be paid for the supplied material and as an incentive to improve the quality of material to be supplied.

In the system presented, the supplied biomass is processed for further processing of the biomass, if needed, for example for the use of the biomass in the production of biofuel or as fuel for a boiler. In the system, the material is also analyzed in such a way that it is possible to find out properties of the material, among other things, for determining the energy content of the material and/or for quality control.

DESCRIPTION OF THE DRAWINGS

In the following, the invention will be described in more detail with reference to the appended drawing, in which.

DETAILED DESCRIPTION OF THE INVENTION

In this application, the term "non-combustible material" refers to any material that is non-combustible in normal boilers, such as metal, demolition waste (for example concrete or asphalt), and mineral soil (for example rock, sand, gravel, or clay). Of these, particularly problematic materials are normally rocks, because they may e.g. break devices, and clay which binds water to the material. Metal may also cause problems both in a crusher and in further processing, if it is not detected and removed from the incoming material.

In the present application, the term "biomass" refers to any materials of biologic origin, which are suitable for use in the production of biofuel or as fuel for a boiler. Biomass typically comprises virgin materials or waste materials originating from plants, such as wood or grass. In particular, biomass comprises wood-based materials, that is, so-called forest fuel. Forest fuels include, for example, wood, bark, wood chips, logging residue, stumps, branches, and brushwood. In the present application, instead of using the term "forest fuel", the term fuel wood is also used, both terms referring to the same concept in the present application.

In the present application, the term "supplied material" refers to material that contains at least partly biomass.

The term "upper heat value coefficient" refers to the heat value coefficient of a material in a dry matter content of 100%. In the present application, the term "lower heat value coefficient" refers to the heat value coefficient of supplied biomass in the moisture content in which the biomass was supplied.

The term "heat value coefficient" refers, in this application, to the upper heat value coefficient, unless expressed otherwise.

For crushing the material to the desired size and consistency of pieces, mechanical processing of the delivered material is applied, which refers particularly to a crusher or a chopper used for producing crushed or chopped material. One or more conveyors or conveyor parts which are placed upstream of said mechanical processing, conveying the material either directly or indirectly to the mechanical processing, are called the first conveyor 3 in the present application. One or more conveyors or conveyor parts which are placed downstream of said mechanical processing, conveying the material away from the mechanical processing, for example to a further processing plant, are called the second conveyor in the present application. Said conveyors, or at least part of them, may include, for example, a belt conveyor.

The loads of fuel wood supplied typically also contain harmful non-combustible material in addition to the fuel wood. For example in loads of stumps, that is, loads that comprise stumps, typically contain rocks of various sizes, which may be present both as loose rocks and possibly also in rocks left inside the stumps. Logging residue, in turn, contains non-combustible material particularly for the reason that the logging residue is typically stored by roads to wait for transportation. Thus, the lowest layers of the storage of fuel wood are in contact with the soil material. Furthermore, it is possible that rocks are placed as weights onto a pile of logging residue. Thus, these rocks placed as weights may end up in the delivery with the fuel wood.

Figure 1:
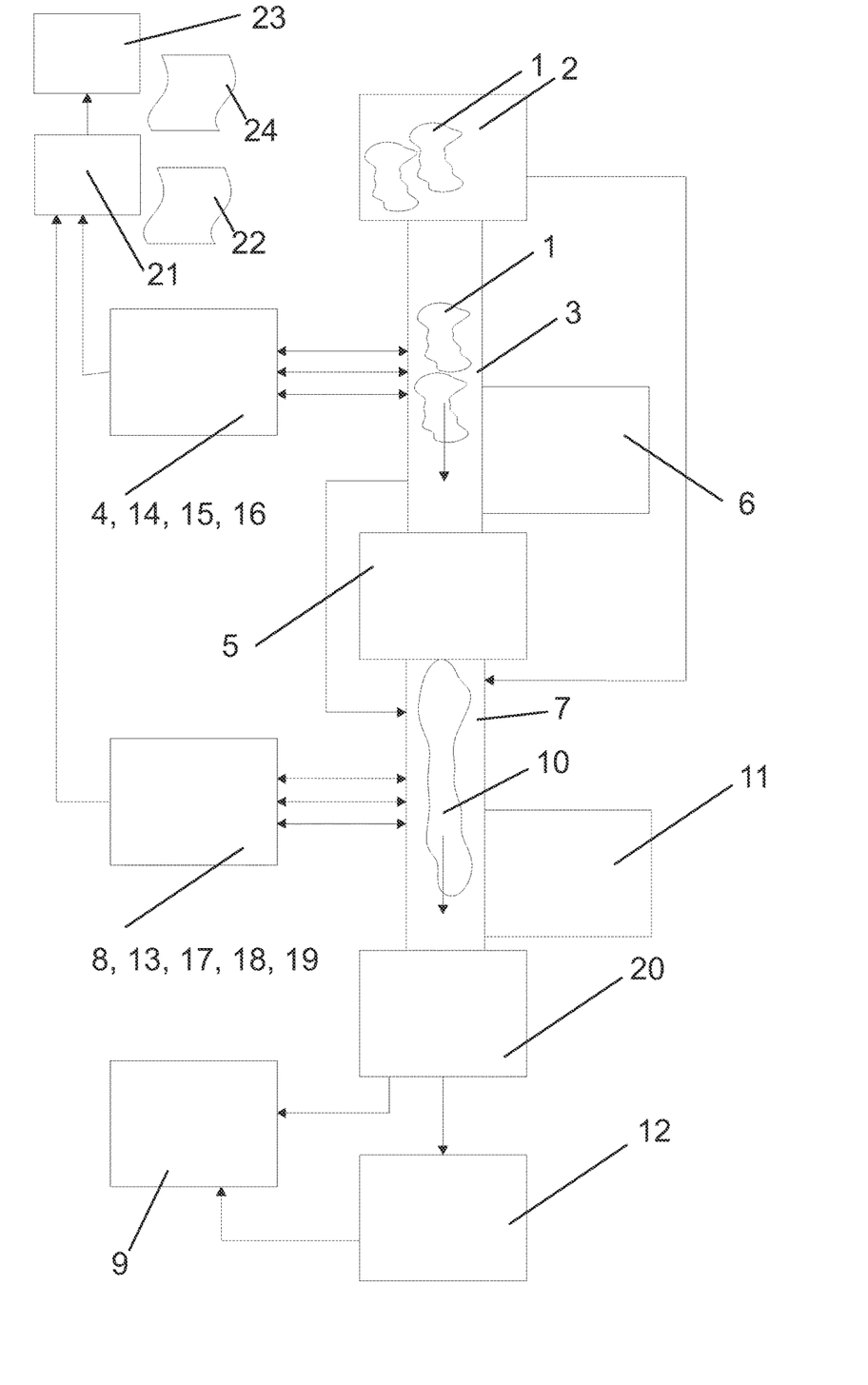
FIG. 1 shows a system according to an embodiment for receiving biomass and for determining its energy content.

FIG. 1 shows an advantageous example system for receiving and processing material, also including the determination of the energy content of the material. The FIGURE shows material 1 supplied, a storage 2 for the material supplied, a first conveyor 3, measurement and measuring devices 4, 14, 15, and 16, comprising one or more of the following: detection 4 of the size of pieces of non-combustible material, measurement 16 of the quantity of non-combustible material, measurement 15 of the quantity of combustible material, detection 14 of the size of pieces of combustible material. The system also comprises an apparatus for mechanical processing 5, first reject 6, a second conveyor 7, measurement and measuring devices 8, 17, 18, 19, comprising one or more of the following: measurement 8 of the quantity of non-combustible material, measurement 17 of the quantity of combustible material, detection 18 of the size of pieces of combustible material, detection 19 of the size of pieces of non-combustible material, measurement 13 of moisture content, as well as second reject 11, and finished crushed material or chips 10, or other side products. FIG. 1 also shows a further processing plant 9 and the drying 12 of wet material. If necessary, the system also comprises an intermediate storage 20 for processed material.

The system, or its subsystem, can be placed apart from the further processing plant, or in its vicinity in such a way that the material is transported to the system and the transport distance to the further processing is short. The system may be stationary, but it is also possible to apply movable systems functioning in the vicinity of the place where material is obtained from. In this way it is also possible to apply, for example, movable crusher or chopper systems which comprise said measurements and conveyors, or to which said measuring devices and conveyors can be connected.

The material 1 supplied can be delivered, depending on the quality and type of the supplied material 1 and also on the needs of the further processing plant 9, for example either to the storage 2 of supplied material or to the first conveyor 3, or even past the mechanical processing 5 directly to the second conveyor 7. The number of storages 2 of supplied material in the system may be one or more, and each storage 2 of supplied material may be either a short-term intermediate storage or a storage intended for a longer term. It may also be possible that the supplied material 1 is always unloaded directly to a conveyor in such a way that there are no storages 2 for supplied material in the system.

The supplied material 1 can be unloaded directly to the second conveyor 7, for example in the case that the supplied material load does not contain such material which would need to be led to mechanical processing 5 to secure the cost-effectiveness or the functioning of the further processing plant 9. Such material to be led directly to the second conveyor 7 may be, for example, wood chips or peat.

Material is delivered to the system by, for example, truck or train. The delivered material load has to be weighed before the use of the material. The weighing of the load can be implemented, for example, in connection with the delivery of the material in such a way that the weight of the vehicle bringing the material load is weighed both with the load and without the load. Alternatively or in addition, devices for measuring the weight of the load can be provided either in a separate space or, for example, in connection with one or more of the material conveyors 3, 7.

In an advantageous embodiment, material is transferred by the conveyors in a continuous flow, for example, past the measuring devices, and necessary measurements are taken continuously on the biomass flowing by. By means of the conveyor, material is led, for example, to a crusher or a chopper, and out of the mechanical processing. The rejects 6 and 11 can also be formed by means of conveyors and/or storages.

In one embodiment, the size of pieces and/or the quantity of non-combustible material, such as rocks, in the material 1 supplied onto the first conveyor is measured before the mechanical processing 5. Preferably, at least the size of pieces of non-combustible material should be measured in order to detect large rocks and other large pieces which could break for example a crusher or a chopper. In order to detect all or almost all harmful rocks, the detection 4 of non-combustible material before the mechanical processing 5 is preferably carried out substantially continuously. The measurement 4 for detecting non-combustible material is particularly necessary when fuel wood that contains stumps or the like, typically rock material, is utilized in the further processing plant 9. In addition to rocks, in some cases it may also be necessary to measure the quantity and/or the size of pieces of metal carried with the supplied material 1 before the mechanical processing 5.

Thanks to measurements 4 taken to detect non-combustible material, it is possible to react to the harmful pieces in such a way that it is possible to reduce the burden and simultaneously the need for maintenance of the mechanical processing device, such as a crusher or a chopper. This can be done, for example, by guiding the detected material flow that contains harmful pieces, for example rocks, from the first conveyor 3 to the first reject 6, so that said rocks do not end up in the mechanical processing 5. This can be done to material that contains rocks or other pieces larger than a size set for pieces (that is, a predetermined limit value). Alternatively, the mechanical processing 5 can be stopped until the harmful pieces have bypassed the mechanical processing 5. Operating in this way, unfit material can be discharged from the system, for example, in connection with the measurement 8 of the quantity of non-combustible material.

According to an advantageous example, the quality of supplied material is measured by measurements on combustible material in addition to or instead of the measurements on non-combustible material. For example, by measurements on the size of pieces of combustible material, it may be possible to detect, among other things, the size of stump pieces, for example the real size of pieces and/or the deviation in the size of pieces of pre-crushed stumps. This is useful for example in the case that the size of pieces of combustible material may affect the pricing of the delivered material, typically particularly for the stumps. Also for material other than stumps, it is often useful to measure the size of pieces of combustible material, because the size of pieces of material supplied to the further processing plant typically affects the functionality of said plant, for example in such a way that the uniformity of quality of the material supplied may be proportional to the quality of the final product.

In an example, the size of pieces of combustible material in the biomass 1 supplied onto the first conveyor 3 is measured by a measuring device 14 before the mechanical processing 5. It is thus possible to adjust, for example, the settings of the crusher or the chopper according to the size of pieces in such a way that the size of pieces of combustible material after the mechanical processing 5 would be as uniform as possible. In addition to large sizes of pieces, it is also useful to detect very small sizes of pieces before the mechanical processing 5, because too fine material may also hamper the functionality of the system.

Alternatively or in addition, the size of pieces of combustible material measured before the mechanical processing can be utilized in the quality control system to report the size of pieces of supplied material to the material supplier. Furthermore, this data can be used as a parameter affecting the price of a delivered load.

In an example, the size of pieces of combustible material is measured from the supplied material 1 also after the mechanical processing 5, preferably in connection with the second conveyor 7. It is thus possible to detect not only the size of pieces of the processed material but also the real size of pieces of material guided to bypass the processing. This size of pieces is important, for example, when the material is utilized in the production of biofuel or as fuel for a boiler, and it can be used as one of the control parameters.

In an advantageous embodiment, the size of pieces of non-combustible material is measured both before and after the mechanical processing 5. This makes it possible, among other things, to control effectively the operation of e.g. a crusher or a chopper, and/or to detect a possible need for maintenance. The apparatus can thus be maintained at more optimal intervals than at present, in such a way that the apparatus does not need to be stopped for maintenance as often as in the prior art, just to be on the safe side, but the apparatus can still be maintained each time when the efficiency is becoming poorer. Thus, the predictability of the operation of the apparatus of mechanical processing is also improved.

Not only the size of pieces but also the quantity of combustible material can be measured before and after the mechanical processing 5.

In an example, the measurement of the moisture content 13 of the supplied material 1, the measurement of detection of the size of pieces of combustible material 18, the measurement of the quantity of combustible material 17, the measurement of detection of the size of the pieces of non-combustible material 19, or the measurement of the quantity of non-combustible material 8 is preferably taken in connection with the second conveyor 7. Most preferably, several of these measurements are taken. The measurements 8, 13, 17, 18, or 19 can be taken on the supplied material 1 in connection with the second conveyor 7, irrespective of whether the supplied material 1 has been passed through the mechanical processing 5 or if the supplied material 1 has been fed directly to the second conveyor 7. Preferably, these measurements 8, 13, 17, 18, and 19 are taken for at least fuel wood to be supplied to a further processing plant, and in many cases said measurements are taken for all supplied material 1.

The measurement 13 on the moisture content of the supplied material 1 is advantageously taken first at the above-mentioned stage, in connection with the second conveyor 7, because moisture measurements are typically most reliable when the moisture is measured from a fine fraction. On the basis of the moisture measurements 13, too wet material, such as for example too wet fuel wood, can be forwarded, for example, either to the drying 12 of wet material or to the second reject 11. It is not necessarily viable to burn too wet material, because the combustion costs of such material are usually higher than the economic profit obtained from the burning. In some cases, the drying of the material may also be uneconomic. Such particularly wet material typically includes, for example, branches of trees left for a relatively long time in the forest.

The quantity of non-combustible material should often be measured at said stage in connection with the second conveyor 7, irrespective of whether the quantity of non-combustible material has already been measured before the mechanical processing 5 or whether the supplied material 1 has been led directly to the second conveyor 7. On the basis of the measurement 8 on the quantity of non-combustible material in connection with the second conveyor 7, it is possible to define the content of non-combustible material in the supplied material and thereby to estimate the heat value of the dry matter in the supplied material 1. Thus, material of poor quality and with a particularly high content of non-combustible material whose burning is not economically viable, can be passed to the side, for example to second reject 11 or, for example, as a side product.

In an advantageous embodiment, the measurements 13 on the moisture content of the supplied material 1 and the measurements 8 on the quantity of non-combustible material, or the measurements 17 on the quantity of combustible material are utilized in determining a moisture value and a quality value for the dry mass of the supplied material 1. As the moisture value, it is possible to use, for example, the dry matter content obtained from the moisture content measurement 13, for example as a percentage. As the quality value for the dry mass, it is possible to use, for example, the proportion of combustible material in the whole quantity of delivered biomass, as obtained from the measurements 8 on the quantity of non-combustible material, for example as a percentage. The quality value may also be given, for example, according to classes, wherein material that meets predetermined limit values is always classified in a given quality class.

By combining the moisture value with the quality value of the dry mass, and by combining both of these values to the weight data on the supplied material, it is possible to obtain, as feedback data, the energy content of the whole supplied material substantially in real time. The energy content can thus be defined separately for each material load entered in the system. In the quality value of the dry mass of the material, not only the content of non-combustible and/or combustible material detected after the mechanical processing, but also the quantity of combustible and/or non-combustible material led to the first reject 6 before the mechanical processing 5 are advantageously taken into account.

One or more items of the measurement data obtained by the above-described measurements are stored in a computer system 21 where the measurement data can be processed and compiled into reports, for example a report 22 that contains quality feedback. If necessary, the computer system also serves the rest of the system shown in FIG. 1, and its control. In another example, measurement data are also transferred to a discrete computer system 23, in which the measurement data can be processed and compiled into reports, for example a report 24 that contains quality feedback. The quality feedback system, comprising the computer system 21 and/or the computer system 23, may also be located physically detached from the rest of the system, utilizing communication links. Thus, the quality feedback system is provided with the measurement data and other collected data relating to the material load or the material, so that e.g. a report can be given to the material supplier. The report 22 is, for example, load-specific quality feedback, and the report 24 contains, for example, quality feedback values based on calculation algorithms, formulae or results obtained by combining measurement results. The computer system used may be, for example, a computer relating to the apparatus for mechanical processing, which is also provided with the measurement data obtained from the measuring devices and other information, such as identification data of the material load.

In an embodiment according to one example, material, preferably fuel wood, is carried by a transport vehicle, such as truck or train, to an unloading conveyor, onto which the delivered material 1 is unloaded, either in whole or in suitable lots, from said transport vehicle. After this, the unloading conveyor may convey the load, for example, either to the first conveyor 3, to the second conveyor 7, or to a storage 2 of supplied material. The supplied material 1 can be transported either manually or in an automated way. The material supplied by the transport vehicles can also be kept in temporary storage, from where it is supplied into the system.

In connection with a particular example, a solution is applied, in which the supplied material 1 is automatically identified. When the storage 2 of supplied material is used, in some cases, particularly if the storage 2 of supplied material contains material 1 supplied from several different loads, it may be useful to include a sufficient number of units containing identification data in each load of supplied material. The unit of identification data may be, for example, a micro chip containing the identification data of the load, such as a radio frequency remote identification (RFID tag) or a corresponding device. By using micro chips or other units that contain identification data, the origin of the supplied material 1 can be identified at a relatively low cost even if the supplied material load were kept with several other supplied material loads for some time in the same storage 2 of supplied material.

In an advantageous example, the system comprises one or more of the partial steps below, either in part or in whole:

1. Initial steps:
    weighing of the supplied material 1 and determining the weight of the load,
    in gross weighing, for example by weighing the transport vehicle both with the load and without the load; in net weighing, for example on separate scales or scales placed in connection with at least one conveyor;
    registering the gross and/or net weight of the load;
    allocating identification data to the load, possibly automatically, for example by ID recognition,
    possibly providing the load with concrete identification data, for example by including one or more units that contain identification data in the load.
2. Storage of the supplied material 1 and its transfer to the conveyor 3 or 7:
    conveying the load to the storage 2 of supplied material, or
    conveying the load to the first conveyor 3 or the second conveyor 7 from the storage or directly from the load,
    detecting the load conveyed to the conveyor.
3. Steps taken before the mechanical processing:
    detection 4 of non-combustible material:
        detection of the size of pieces of rocks, or
        particularly high content of non-combustible material, or
        detection of metal,
    preventing the breaking of apparatuses of mechanical processing 5 on the basis of the measurement of detection of non-combustible material, the measurements showing pieces exceeding a predetermined limit value:
        the material fraction containing pieces exceeding the limit value are led to first reject 6, or
        the mechanical processing 5 is stopped for the time of removal of the material exceeding the limit value, or
        the mechanical processing 5 is stopped and the material exceeding the limit value is led to bypass the mechanical processing,
    the biomass remaining within the limit values is passed to the mechanical processing 5,
    detection 14 of the size of pieces of combustible material, detection of the size of pieces of supplied biomass:
preferably in a substantially continuous measurement,
it is possible to adjust the functional parameters of the apparatuses of mechanical processing according to the size of material pieces for example in such a way that the size of pieces after the processing would be as uniform as possible;
detection 15 of the quantity of combustible material.

4. Steps which can be taken after the mechanical processing for the material led through mechanical processing and/or for the material led directly to the second conveyor:
leading the material load to the second conveyor 7,
taking measurements 13 on the moisture content advantageously as a substantially continuous measurement:
if the momentary moisture content of the material measured exceeds a predetermined limit value:
the part exceeding the limit value is led to drying 12 of moist material, or
the part exceeding the limit value is led to the second reject 11,
calculating the average moisture content of the supplied material 1 on the basis of the measured moisture contents,
taking measurements 8 on the quantity of non-combustible material and/or measurements 17 on the quantity of combustible material, preferably as a continuous measurement:
if the quantity of non-combustible material exceeds a predetermined limit value:
the part of the material exceeding the limit value is led to the second reject 11, or
the part of the material exceeding the limit value is discharged as a by-product,
calculating the average content of non-combustible material in the supplied material 1 by means of the measurements on the quantities of non-combustible material, if it has not been separately measured,
detecting the size of pieces of combustible material:
detecting the size of pieces of supplied biomass,
preferably taken as a substantially continuous measurement,
it is possible to adjust the functional parameters of the apparatuses of the mechanical processing 5 on the basis of the data on the size of pieces measured after the processing,
it is possible to detect a need for maintenance of the apparatus, if data on the size of pieces is measured before and after the mechanical processing and the functional parameters of the apparatuses are also taken into account.

5. Providing quality feedback, for example as a report 22:
the quality feedback may be, for example, load-specific and/or it may comprise a given period of time,
for example, one or more of the following items of data are entered in the system:
the weight of the supplied material 1, and
the moisture content, for example a moisture value computed on the basis of the average moisture content, to indicate the dry matter content (%) of the supplied material,
a quality value of the dry mass, computed on the basis of the average content of non-combustible or combustible material, to indicate the content (%) of combustible material in the total material quantity,
an upper and/or a lower heat value coefficient,
the size of pieces of non-combustible and/or combustible material,
possible special measures, if the content of reject in the load (total reject and possibly also by-product) exceeds a predetermined limit value (too much too moist material and/or too much non-combustible material);
giving feedback on the quality of the load and/or for a given period of time to the supplier of the load;
feedback for example via a particular quality feedback application and/or a supplier server;
possibility to influence the performance of the supplier of the load by a delivery specification,
the delivery specification can be used as an aid in the planning of the supplier's own performance.

6. Determining quality feedback values, for example as a report 23:
giving feedback on the quality of the supplied material to the supplier of the material, for example specified for each load or, for example, for an agreed period of time;
feedback for example via a special quality feedback application and/or supplier server, for example the computer system 21 or the computer system 23;
possibility to influence the performance of the supplier of the load by a delivery specification;
informing the supplier of the load on one of more of the following quality feedback values:
percentage of moisture in the supplied material (calculated from the total load and/or the combustible material),
quality value for the load (for example quality class and/or content of combustible material),
size of pieces of combustible material supplied,
quantity of combustible material supplied,
size of pieces of non-combustible material supplied,
quantity of non-combustible material supplied,
upper heat value coefficient of the biomass supplied,
lower heat value coefficient of the biomass supplied,
monetary value of the material supplied,
energy content (MWh and/or MWh/t) of biomass supplied, in dry matter, and/or
energy content (MWh and/or MWh/t) of load supplied in the state received.
the delivery specification can be used as an aid in the planning of the supplier's own performance,
possible special measures, if the content of reject in the load (total reject and possibly also by-product) exceeds a predetermined limit value (too much too moist material and/or too much non-combustible material).

The price to be paid for the supplied material can be formed, for example, on the basis of the weight, the moisture value, the heat value coefficient, and the quality value for the dry mass of the load. It is also possible to take into account other factors, such as the size of pieces of the supplied material (combustible and/or non-combustible material). When determining the price to be paid for the load, it is possible to apply, for example, fees per MWh, wherein one or more of the above-mentioned quality feedback values are advantageously taken into account. In one advantageous example, when determining the tariffs, the following factors are taken into account:
the quantity of combustible material in the load (t), which can be formed, for example, by means of the weight of the supplied material (1) and the quality value of the dry mass, or on the basis of the quantity of combustible material in the biomass, and/or
the (lower) heat value coefficient (MWh/t) of the material supplied, which can be formed, for example, by taking into account the quantity of combustible material in the supplied load (t), the moisture value (%) of the load supplied, as well as the (upper) heat value coefficient of the dry matter of the material, and/or for example the upper heat value coefficient of dry matter in wood is typically almost constant (in the order of 5 MWh/t).

Consequently, all the above-mentioned quality feedback values can influence the price to be paid for a load; in an advantageous example, factors affecting the price to be paid include at least the weight (t) of the biomass, the quality value of the dry mass, the moisture value, and/or the effective heat value coefficient (MWh/t) of the biomass, advantageously also the size of material pieces. In this way, the supplier can be rewarded with a better price for fuel wood of good quality, in which case fuel wood material of good quality is in the interests of both the supplier and the further processing plant.

In an advantageous embodiment, the quality feedback system is capable of giving, as feedback, any measured data entered in the system. Furthermore, the quality feedback system is capable of giving, as feedback, not only measurement results but also data produced by combining measurement data with other information. This data or at least some of it can be given as feedback via the quality feedback system to the biomass production end. Advantageously, such feedback data can also be utilized to make sure that the measurements are correct.

The value for the proportion of reject in a load can be any value agreed in advance. In view of cost effectiveness, a suitable limit value for the reject may be, for example, a maximum of 10 to 12% of the quantity of the load.

The lower heat value coefficient for the load can be formed, for example, if the upper heat value coefficient and the total moisture content of the material in the state as delivered are known. Among other things, the lower heat value coefficient for wood and peat can be calculated, for example, by the following formula:

$$Q\text{net}(ar) = Q\text{net}(d) \times (100 - Mar)/100 - (E(H_2O)/y) \times Mar,$$

in which

Qnet(ar) is the lower heat value coefficient (MJ/kg),

Qnet(d) is the upper heat value coefficient (MJ/kg), typically about 5 for wood, Mar is the total moisture content (%) in the state as received, weighted by the mass of moist fuel, typically about 50 for fuel wood, $E(H_2O)$ is the amount of heat consumed in vaporization of water (for example about 0.02443 MJ/kg at the temperature of 25° C.), and y is the conversion factor from MJ to kW, which is 3.6.

The measurements on the size of pieces can be taken in connection with one or more conveyors by measuring the size of pieces of combustible material, and/or the size of pieces of non-combustible material.

Advantageously, the size of pieces of both the non-combustible material and the combustible material is measured in such a way that both measurements are taken both before and after the mechanical processing.

The measurement of non-combustible material can be taken, for example, by means of acoustic interpretation, electromagnetic radiation and/or photo interpretation (interpretation of size of pieces). Metal can be measured for example by metal detectors and separated from other material for example in the same way as other non-combustible material, or for example by magnets. The moisture content can be measured, for example, by irradiating the material conveyed on the conveyor with a radioactive or infrared radiation source; as a result, the quantity of water molecules, that is, the moisture content of the material, can be obtained. The measurements can be taken by measuring devices and methods known as such, which are applied in the system and the method presented above. One or more measurements are advantageously taken as a continuous measurement of the material flow.

By applying the system according to the invention, it is possible to process material that is supplied to several different production plants, such as, for example, to the production of biofuel and as fuel for a boiler.

The invention is not limited solely to the examples presented in the above description, but the inventions are characterized in what will be presented in the following claims.

The invention claimed is:

1. A method for processing a material that contains wood-based material, in which method the material is guided to a conveyor and by the conveyor to at least one of an apparatus for mechanical processing and to a further processing plant, the method comprising:

measuring the moisture content, the size of pieces of non-combustible material and the quantity of non-combustible material in the material in connection with said conveyor, providing quality feedback data on the material, wherein the quality feedback data is based on the measured moisture content, the measured size of non-combustible material, and the measured quantity of non-combustible material in the material in connection with said conveyor, conveying, on the basis of said measurements, measured material to at least one of the further processing plant and the apparatus of mechanical processing.

2. The method according to claim 1, wherein the method comprises conveying the measured material to said apparatus of mechanical processing, by means of the conveyor, measuring upstream of said apparatus of the mechanical processing, the size of pieces of non-combustible material with a measuring device, and determining, based on the result of the measurements, whether said measured material is to be led away from the conveyor or whether it is to be led by the conveyor to the apparatus of mechanical processing, to be crushed.

3. The method according to claim 1, wherein the method comprises measuring at least one of the size of pieces and quantity of combustible material in the material flow in connection with the conveyor and leading at least part of the measured material to a further processing plant, and the method further comprising at least one of adjusting the functional parameters of the further processing plant and controlling the quality of the measured material to be led to the further processing plant on the basis of the measurements on the size of pieces or the quantity of combustible material.

4. The method according to claim 1, wherein the conveyor comprises a first conveyor and a second conveyor, material is led by the first conveyor to the apparatus of mechanical processing, by which at least part of the material is crushed before the material is led from the apparatus of mechanical processing to the second conveyor.

5. The method according to claim 2, wherein when the measurements show that at least one of the size of pieces and the quantity of noncombustible material exceeds a predetermined limit value, at least one of the following steps is taken:
said measured material is led to reject, and
the apparatus of mechanical processing is stopped for a time that is sufficiently long for the harmful material to be discharged from the conveyor leading to said apparatus of mechanical processing.

6. The method according to claim 1, wherein the method further comprises:
determining the weight of said material,
determining the quantity of combustible and non-combustible material in connection with the conveyor, and
determining the energy content of said material on the basis of the data determined in the preceding steps and an upper heat value coefficient.

7. The method according to claim 1, wherein the method comprises providing quality feedback data on the supplied material, by entering characteristic data on the material to the quality feedback system, on the basis of which characteristic data the quality feedback system produces a quality feedback report that contains quality data produced on the basis of said entered data, concerning said material.

8. The method according to claim 7, wherein the method comprises entering one or more of the following data on the material in the quality feedback system:
the quantity of combustible material in the material,
the quantity of non-combustible material in the material,
the size of pieces of combustible material,
the size of pieces of non-combustible material,
the moisture content or the dry matter content of the material, and
the upper heat value coefficient of the combustible material,
wherein the method comprises giving one or more of the following items of data as quality feedback data:
the monetary value of the material,
the energy content of the material in the state when received,
the energy content of material suitable for further processing,
the quality value of material,
the size of pieces of combustible material, and
the size of pieces of non-combustible material.

9. The method according to claim 7, wherein the method comprises entering the size of pieces of at least one of non-combustible and combustible material as data to the quality feedback system, wherein the quality feedback data comprises at least said data on at least one of the size of pieces of non-combustible and combustible material.

10. The method according to claim 7, wherein the method comprises entering, as data, of at least the moisture content of the supplied material, the quantity of combustible or non-combustible material, and the upper heat value coefficient of combustible material, wherein the quality feedback data comprises at least the data on the energy content of said supplied material.

11. The method according to claim 7, wherein the method comprises determining and setting of one or more of the following data as the quality feedback data:
the monetary value of the supplied material,
the energy content of the supplied material in the state when delivered,
the energy content of the part of supplied material that is suitable for further processing,
the weight of the supplied material,
the upper heat value coefficient of the supplied material, and
the quality value of the supplied material, or the moisture content of the supplied material.

12. A system for processing material that contains wood-based material, the system comprising:
at least one conveyor; and
an apparatus for mechanical processing;
wherein the system further comprises:
measuring devices for measuring the moisture content, the quantity of non-combustible material the size of pieces of non-combustible material in the material in connection with said conveyor,
wherein
the at least one conveyor is arranged for conveying said material, on the basis of said measurements, to a further processing plant or to the apparatus for mechanical processing; and
the system further comprises:
a transfer apparatus for transferring said material from the conveyor, on the basis of said measurements to at least one other place; and
a quality feedback system for producing quality feedback data on the material, wherein the quality feedback data is based on the measured moisture content, and the measured size and the measured quantity of non-combustible material from the material.

13. The system according to claim 12, wherein
the at least one conveyor comprises a first conveyor arranged to convey the material to said apparatus for mechanical processing,
the measuring devices measure the size of pieces of non-combustible material from the material in connection with the first conveyor,
the transfer apparatus transfers material from the first conveyor to reject upstream of the apparatus for mechanical processing when at least one measurement exceeds a predetermined limit value.

14. The system according to claim 13, wherein
the at least one conveyor further comprises a second conveyor for conveying material to a further processing plant,
the measuring devices further measure at least one of the size of pieces and the quantity of combustible material in the material in connection with the second conveyor, and
the system further comprises control devices for controlling functional parameters of the further processing plant or for controlling the quality of material to be led to the further processing plant, on the basis of at least one measurement taken.

15. The system according to claim 12, wherein the at least one conveyor comprises a first conveyor for conveying material to the apparatus for mechanical processing, and a second conveyor for conveying material from the apparatus for mechanical processing to a further processing plant.

16. The system according claim 12, wherein the system comprises devices for stopping the apparatus for mechanical processing on the basis of at least one measurement taken on the non-combustible material.

17. The system according to claim 15, wherein the system comprises
devices for measuring the weight of said material,
devices for measuring the quantity of at least one of combustible and non-combustible material in said material in connection with the first and second conveyor, devices for measuring the moisture content of said material in connection with the first and second conveyor, and devices for determining the energy content on the basis of an upper heat value coefficient and the measured data.

18. The system according to claim 12, wherein the quality feedback system produces, on the basis of entered data from the material, a quality feedback report that contains quality data on said material.

19. The system according to claim 18, wherein one or more of the following items of data on the material are arranged to be entered in the quality feedback system:
the quantity of combustible material in the material,
the quantity of non-combustible material in the material,
the size of pieces of combustible material,
the size of pieces of non-combustible material,
the moisture content or dry matter content of the material, and
the upper heat value coefficient of the combustible material,
and that the quality feedback data comprises one or more of the following items of data:
the monetary value of the material,
the energy content of the material in the state when delivered,
the energy content of material suitable for further processing,
the quality value of the material,
the size of pieces of combustible material, and
the size of pieces of non-combustible material.

20. The system according to claim 18, wherein the size of pieces of non-combustible and combustible material is arranged to be entered as data into the quality feedback system, wherein the quality feedback data comprises at least said data on the size of pieces of non-combustible and combustible material.

21. The system according to claim 18, wherein at least the moisture content of the material, the quantity of combustible or noncombustible material, and the upper heat value coefficient of combustible material, are arranged to be entered as data into the system, wherein the quality feedback data comprises at least the data on the energy content of said material.

22. The system according to claim 18, wherein the system is arranged to determine and set one or more of the following items of data as the quality feedback data:
the monetary value of the supplied material,
the energy content of the supplied material in the state when delivered, the energy content of the part of supplied material that is suitable for further processing,
the weight of the supplied material,
the upper heat value coefficient of the supplied material,
the quality value of the supplied material, and
the moisture content of the supplied material.

* * * * *